June 27, 1967 W. F. KRASINSKI 3,328,077
LATCHING AND HINGING ASSEMBLY FOR FOLDING SEAT
Filed Oct. 21, 1965 4 Sheets-Sheet 2

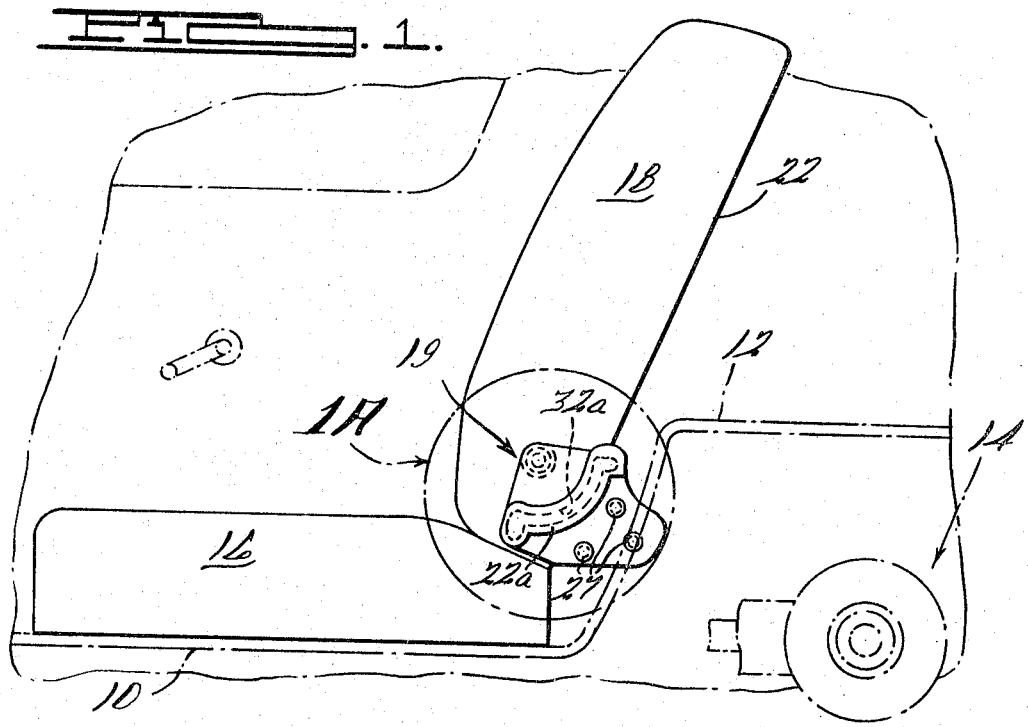
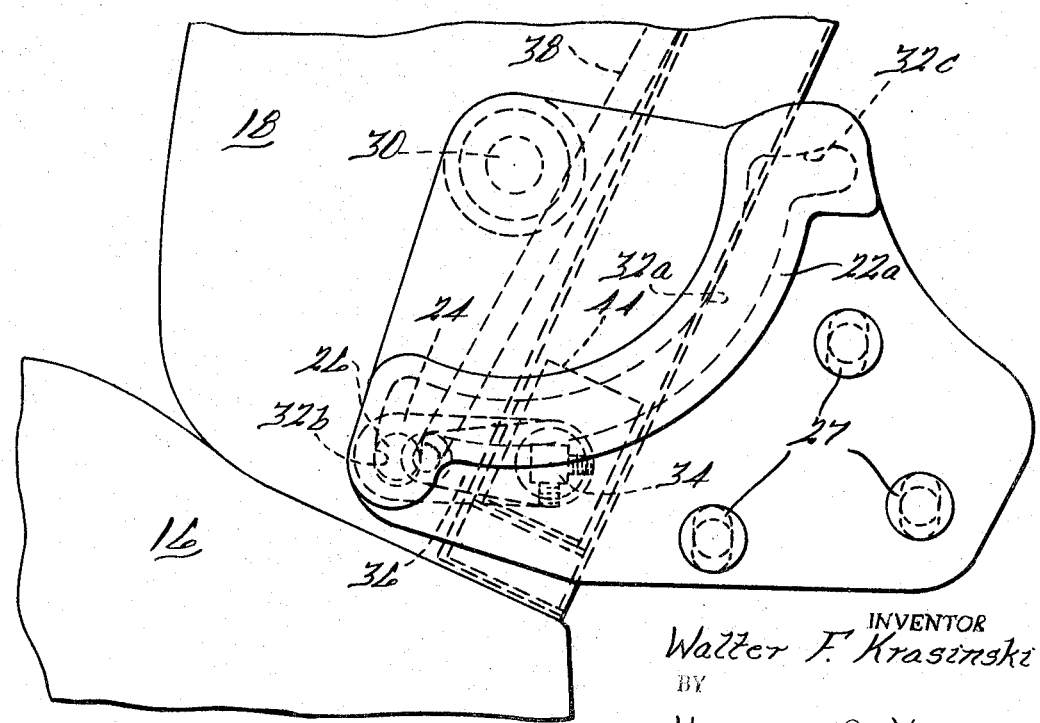

INVENTOR.
Walter F. Krasinski
BY
Harness and Harris
ATTORNEYS

June 27, 1967 W. F. KRASINSKI 3,328,077
LATCHING AND HINGING ASSEMBLY FOR FOLDING SEAT
Filed Oct. 21, 1965 4 Sheets-Sheet 3
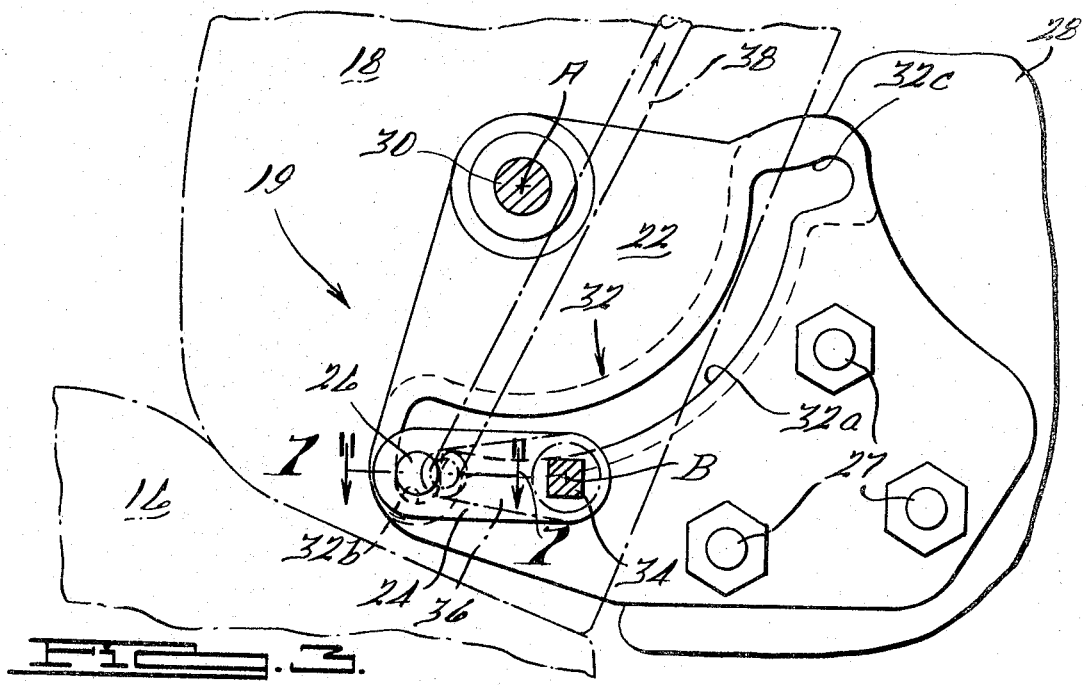
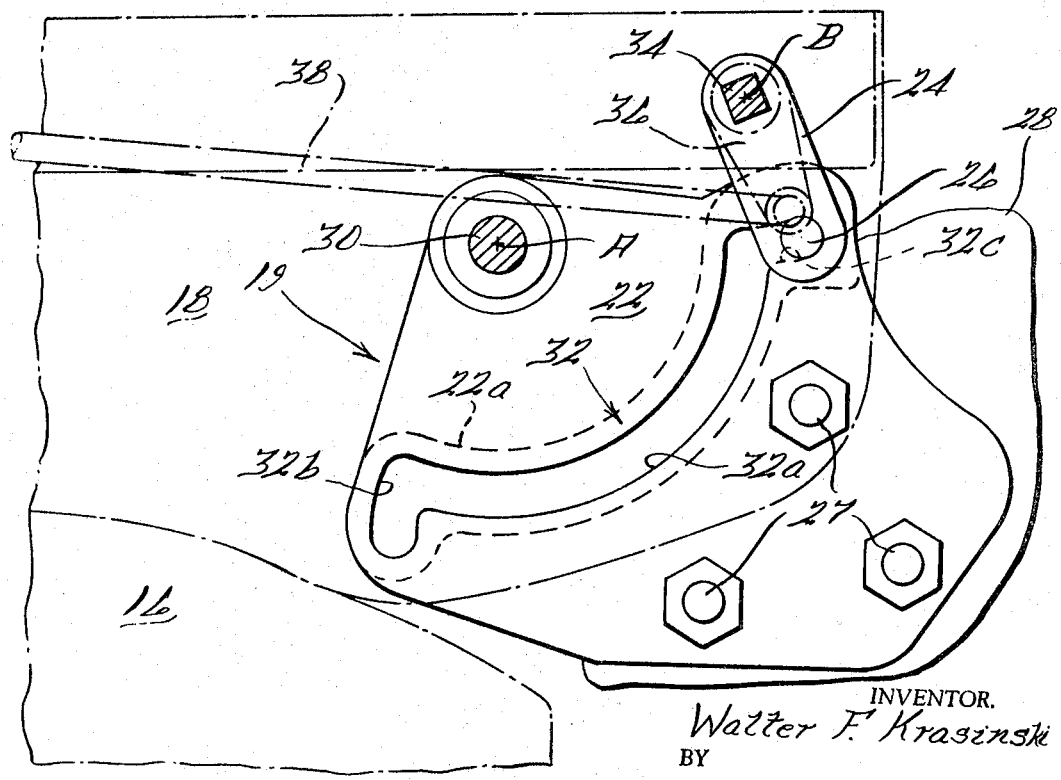
INVENTOR.
Walter F. Krasinski
BY
Harness and Harris
ATTORNEYS.

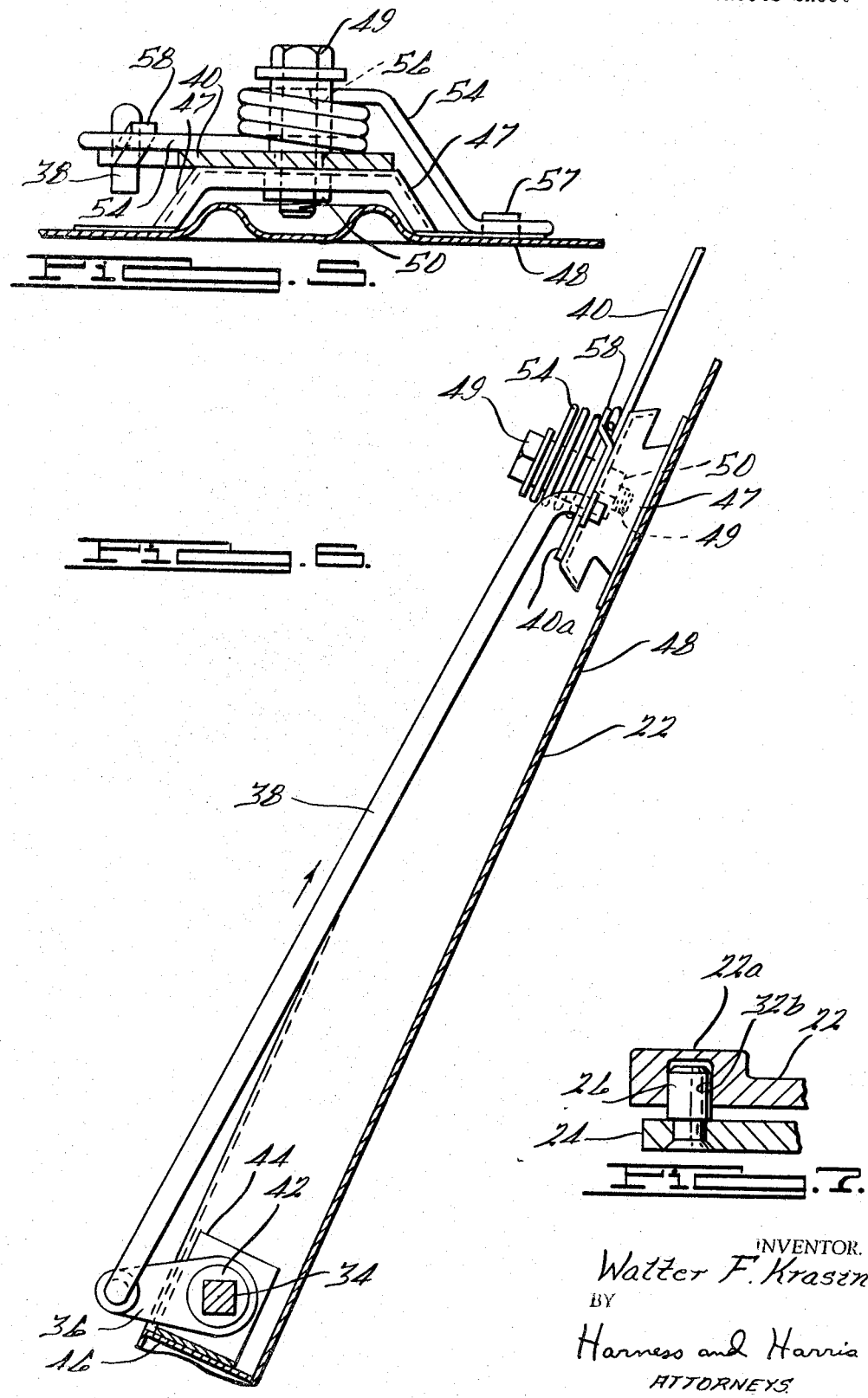

United States Patent Office 3,328,077
Patented June 27, 1967

3,328,077
LATCHING AND HINGING ASSEMBLY FOR FOLDING SEAT
Walter F. Krasinski, Detroit, Mich., assignor to Chrysler Corporation, Highland Park, Mich., a corporation of Delaware
Filed Oct. 21, 1965, Ser. No. 499,293
12 Claims. (Cl. 297—379)

This invention relates to folding seat assemblies. More particularly it relates to a folding seat assembly for a utility or multi-purpose automobile.

In a folding seat assembly for an automobile it is necessary to provide means to hinge the seat back for its pivotal movement between seating and folded positions. It is also necessary to provide means to securely latch the seat back in each of its positions, as well as means to release the latching mechanism in each position to allow the seat back to be moved to its other position.

Various forms of latching and hinging assemblies have been proposed for use with automobile folding seats. In each of these proposals, however, the latching or hinging elements are exposed in the folded and/or seating position of the seat back. Exposure of the hinging or latching elements is objectionable in several important respects. Firstly, the exposed latching or hinging elements create a safety hazard. Secondly, they interrupt the otherwise clear loading space available with the seat back in the folded position, thereby interfering with loading and potentially damaging the cargo. Thirdly, they impart a cluttered and aesthetically displeasing appearance to the cargo area.

Each of the prior latching and hinging proposals is also relatively complex and therefore expensive, both from the standpoint of high cost of parts as well as from the standpoint of high cost of labor for assembly.

Certain of the prior latching and hinging proposals are also rather difficult to operate, requiring a dexterity and/or strength beyond the ability of many motor vehicle operators.

Accordingly, it is an object of the present invention to provide an improved latching and hinging assembly for a folding seat.

It is a more particular object to provide an improved latching and hinging assembly for a folding seat in a utility or multi-purpose automobile.

Another object is to provide a latching and hinging assembly as aforesaid which is simple in design and inexpensive in construction.

Yet another object is to provide a latching and hinging assembly as aforesaid in which neither the latching nor the hinging elements are exposed in either the folded or the seating position of the seat back.

Still another object is to provide a latching and hinging assembly as aforesaid which is extremely easy to operate, requiring neither unique dexterity nor exceptional strength.

The latching and hinging assembly of the invention, broadly considered, comprises an arm member mounted at one end on the seat back at one side of the latter for pivotal movement about a generally horizontal axis spaced from but generally adjacent to the seat back axis, a pin projecting laterally from the free end of the arm member, and a fixed member positioned adjacent the aforesaid one side of the seat back and defining an elongate guide surface against which the pin on the free end of the arm member bears. The guide surface extends generally along the arcuate path traced by the pivotal axis of the arm member as the seat back is moved between its folded and seating positions, and is generally coterminus with this path. Thus, as the seat back is pivoted, the pin guides smoothly along the guide surface until the seat back reaches one of its extreme positions, whereupon the pin runs off of the guide surface to allow the arm member to pivot about its own axis and move the pin to a remote position where it coacts with the fixed member to block return movement of the seat back.

In the preferred embodiment of the invention, the elongate guide surface is provided by the arcuate central portion of a three part composite slot formed in the aforesaid fixed member. This composite slot includes the aforesaid arcuate central portion, and first and second arcuate end portions adjoining the respective ends of the central portion. The central slot portion is laid out as an arc centered on the seat back axis. The first arcuate end portion has a mean radius substantially equal to the effective length of the arm member and extends from one end of the central slot portion with its center at a given point along the arcuate path of the arm member axis corresponding to the seating position of the seat back. The second arcuate end portion has the same radius as the first end portion and extends from the other end of the central slot portion with its center at another given point along the arcuate path of the arm member axis corresponding to the folded position of the seat back.

Thus, as the sat back is pivoted, the pin guides smoothly along the central slot portion until the seat back reaches one of its extreme positions, whereupon the pin runs out of the central slot portion to allow the arm member to pivot about its own axis and move the pin into an arcuate end slot portion where it blocks return movement of the seat back.

The preferred embodiment of the invention further includes spring means which bias the arm member for positive movement into the arcuate end portions of the slot, and manually operable handle means which enable the operator to move the pin out of the arcuate end portions to free the seat back for pivotal movement to a new position.

These and other objects, features and advantages of the invention will be apparent from the following detailed description of a preferred embodiment of the invention and from the accompanying drawings wherein:

FIG. 1 is an end elevational view of a folding seat assembly for an automobile embodying a latching and hinging assembly according to the invention;

FIG. 1A is a view on an enlarged scale of the structure within the circle 1A of FIG. 1;

FIG. 2 is a rear elevational view of the seat assembly of FIG. 1;

FIG. 3 is a view taken on line 3—3 of FIG. 2, showing the cooperation of the various hinging and latching elements with the seat back in its seating position;

FIG. 4 is a view similar to FIG. 3 but showing the cooperation of the hinging and latching elements with the seat back in its folded position;

FIGS. 5 and 6 are sectional views taken on lines 5—5 and 6—6 respectively, of FIG. 2; and FIG. 7 is a sectional view taken on line 7—7 of FIG. 3.

The folding seat assembly of the invention is shown in FIG. 1 as the rear seat of an automobile. The body of the automobile appears fragmentarily and in phantom in FIG. 1 and includes a rear floor portion 10 and a cargo floor portion 12 elevated above the level of floor portion 10 to provide clearance for the rear axle assembly 14.

The seat assembly includes a seat bottom 16 supported on floor portion 10, a seat back 18, left and right hinging and latching assemblies 19, and a release assembly 20 (FIG. 2).

Hinging and latching assemblies 19 mount seat back 18 for pivotal movement between the illustrated upright or seating position and a folded position in which it overlies seat bottom 16 with its back surface 22 flush with cargo floor portion 12 to form therewith a continuous cargo floor; assemblies 19 also serve to latch the seat back in either of its positions. Release assembly 20 serves to release the seat back in each position for movement to its other position. Left hinging and latching assembly 19 is identical to right assembly 19 except for hand. Left assembly 19 appears in FIGS. 1 and 1A and right assembly 19 appears in FIGS. 3 and 4.

Each assembly 19 comprises a fixed member 22, an arm member 24, and a pin member 26.

The fixed member 22 of each assembly is in the form of a plate rigidly secured in a vertical position adjacent a respective side of seat back 18 by bolts 27 passing through the adjacent wheel housing 28 (FIG. 2) of the automobile body. Each plate 24 carries a hinge pin 30 journalled in the adjacent side of the seat back; pins 30 thus mount the seat back for pivotal movement about the horizontal axis A of the pins.

Each arm member 24 is mounted at one end on a respective side of seat back 18 for pivotal movement relative to the seat back about a horizontal axis B which is spaced from and generally below seat back axis A.

Each pin member 26 is rigidly secured to the free end of the related arm member 24 and projects laterally outwardly therefrom for coaction with a slot or groove 32 defined by the adjacent plate 24.

Each slot or groove 32 is elongated and extends generally along the arcuate path traced by axis B as the seat back is moved between its seating and folded positions. As best seen in FIG. 7, each slot or groove 32 is formed in a thickened portion 22a of the related plate 22 and opens at the inner face of that plate to slidably receive the related pin member 26.

Each slot or groove 32 includes a central portion 32a, a first end portion 32b, and a second end portion 32c.

The central portion 32a of each slot is laid out on an arc centered on axis A. The end portion 32b of each slot is laid out on an arc centered on the point occupied by axis B when the seat back is in its seating position. The mean radius of each end portion 32b is equal to the distance between axis B and the center of pin members 26. Similarly, the end portion 32c of each slot is laid out on an arc centered on the point occupied by axis B when the seat back is in its folded position, and has a mean radius equal to the distance between axis B and the center of pin members 26. The width of each slot or groove 32 is slightly greater than the diameter of pin members 26.

Release assembly 20 includes a shaft 34, a crank arm 36, a rod 38, and a handle member 40.

Shaft 34 is rectangular in cross section and is journalled for rotation on axis A by bushings 42 rotatably received in the respective upstanding legs of a U bracket 44 suitably secured to a transverse frame member 46 of seat back 18. Bushings 42 have enlarged head portions 42a which seat against the respective upstanding legs to space the inner ends of the bushings apart. Crank arm 36 is fixedly positioned on shaft 34 between the spaced inner ends of the bushings 42. Shaft 34 passes at its outer ends through the respective side faces of the seat back for securement to the respective crank arms 24.

Handle member 40 is pivotally mounted at its lower end on a bracket 47 suitably secured to the inner face of back plate 48 of seat back 18. Member 40 is mounted on bracket 47 by a bolt 49 passing through handle member 40 for threaded engagement with a nut 50 welded to the under face of bracket 47. The upper end of handle member 40 projects into a recess 51 defined by a concave housing member 52 suitably embedded in the upper rear face of the seat back. Recess 51 opens at the rear face of the seat back to allow access to a knob 53 secured to the upper end of handle member 40.

Rod 38 is pivotally secured at its lower end to the free end of crank arm 36 and at its upper end to the radially outer edge of a radially enlarged hub portion 40a of handle member 40. A torsion spring 54 is wound around a spacer 56 positioned between the head of bolt 49 and the top surface of bracket 47. Spring 54 is anchored at one end by a prong 56 struck from back plate 48 and is caught at its other end by an upstanding, offset finger 58 formed integral with hub portion 40a of handle member 40.

*Operation*

When the seat back is in its upright or seating position, handle member 40 is in the solid line position of FIG. 2 and pins 26 are seated in the respective slot end portions 32b, as seen in FIG. 3. Movement of seat back 18 in either direction is now prevented by engagement of pins 26 with one or the other of the side walls of slot portions 32b. When it is desired to move the seat back to its folded position, knob 53 is grasped to move handle member 40 clockwise, against the resistance of spring 54, to its dotted line position of FIG. 2. This raises rod 38 and pivots shaft 34 and thereby arm members 24 clockwise, as viewed in FIG. 3, about axis B. This clockwise movement of arm members 24 moves pin members 26 arcuately along slot end portions 32b and into slot central portions 32a. Seat back 18 may now be pivoted about axis A toward its folded position. As the seat back moves toward its folded positions, pins 26 guide smoothly along central slot portions 32a. Since slot portions 32a are laid out on arcs centered on axis A, as the seat back is pivoted about axis A arms 24 undergo no rotation relative to the seat back and handle member 40 remains steadily in its dotted line position.

As the seat back reaches its folded position, as seen in FIG. 4, axis B moves into a position where it is at the center of arcuate slot end portions 32c, whereupon spring 54 unwinds to pivot arm members 24 counter-clockwise about axis B and move pins 26 into end portions 32c where they act to positively prevent movement of the seat back in either direction. When it is again desired to move the seat back to its seating or upright position, the above described procedure is repeated, with spring 54 unwinding as axis B moves into a position at the center of arcuate slot end portions 32b to kick pins 26 into end portions 32b and firmly latch the seat back in its folded position.

The latching and hinging arrangement of the invention will be seen to provide several important advantages. Since the latching and hinging elements are all grouped around the lower edge of the seat back, they are substantially inaccessible and out of sight in either the seating or folded positions of the seat back.

Because of their inaccessible positions, they are not likely to injure occupants, either during the course of normal usage of the vehicle or under emergency or collision conditions. They are also not likely to injure or snag cargo, nor interfere with the loading or unloading of cargo. The out-of-sight disposition of all of the hinging and latching elements also imparts a clean and aesthetically pleasing appearance to the cargo area. The latching and hinging arrangement of the invention is also extremely easy to operate, and yet provides a positive latching action in either position of the seat back. The described latching and hinging construction is also relatively simple and inexpensive.

While a preferred embodiment of the invention has been illustrated and described in detail, it will be understood that various changes may be made in the disclosed embodiment without departing from the scope or spirit of the invention as defined in the appended claims.

I claim:
1. In combination
   (A) a swinging member mounted for pivotal movement about a fixed axis between first and second positions;
   (B) an arm member mounted at one end of said swinging member for pivotal movement relative to said swinging member about an axis generally parallel to and spaced from said fixed axis;

(C) a pin projecting laterally from the free end of said arm member; and (D) a fixed member positioned adjacent said arm member and defining an elongate guide surface which is generally parallel to said axes and extends in a plane generally transverse to said axes, said surface (1) extending generally along and in the same general direction as the arcuate path traced by said arm member axis as the swinging member is moved between its aforesaid position and (2) being generally coterminus with said arcuate path, whereby said pin guides along said guide surface as said swinging member is moved between its aforesaid positions and said arm member pivots about its axis as said pin reaches a terminus of said surface to move said pin away from said surface to a remote position blocking return movement of said seat back.

2. A folding seat assembly comprising (A) a seat bottom;

(B) a seat back mounted for pivotal movement relative to said seat bottom about a generally horizontal axis between angularly spaced first and second positions;

(C) an arm member mounted at one end of said seat back at one side of the latter for pivotal movement relative to said seat back about a generally horizontal axis spaced from the seat back axis;

(D) a pin projecting laterally from the free end of said arm member; and (E) a fixed member positioned adjacent said one side of said seat back and defining an elongate guide surface which (1) extends generally along and in the same general direction as the arcuate path traced by said arm member axis as the seat back is moved between its aforesaid positions and (2) is generally coterminus with said arcuate path, whereby said pin guides along said guide surface as said seat back is moved between its aforesaid positions and said arm member pivots about its center as said pin reaches a terminus of said surface to move said pin away from said surface to a remote position blocking return movement of said seat back.

3. A folding seat assembly comprising (A) a seat bottom;

(B) a seat back mounted for pivotal movement about a generally horizontal axis between.

(1) a seating position in which it extends generally upwardly from the rear edge of said seat bottom and (2) a folded position in which it generally overlies said seat bottom;

(C) an arm member mounted at one end on said seat back at one side of the latter for pivotal movement relative to said seat back about a generally horizontal axis spaced from the seat back axis;

(D) a pin projecting laterally from the free end of said arm member; and (E) a fixed member positioned adjacent said one side of said seat back and defining an elongate guide surface which (1) extends generally along and in the same general direction as the arcuate path traced by said arm member axis as the seat back is moved between its aforesaid positions and (2) is generally coterminus with said arcuate path, whereby said pin guides along said guide surface as said seat back is moved between its aforesaid positions and said arm member pivots in a given direction about its center as said pin reaches a terminus of said surface to move said pin away from said surface to a remote position blocking return movement of said seat back.

4. A folding seat assembly according to claim 3 and further including means continuously biasing said arm member for pivotal movement in said given direction, whereby to move said arm member positively to its said remote position.

5. A folding seat assembly according to claim 4 and further including:

(A) a manually operable member;

(B) means mounting said manually operable member on said seat back for selective movement between first and second positions, and (C) means connecting said manually operable member to said arm member and operable in response to movement of said manually operable member between its first and second positions to pivot said arm member in the direction opposite to said given direction, whereby manipulation of said manually operable member moves said pin, against the action of said biasing means, out of its remote position and back onto said guide surface.

6. A folding seat assembly comprising (A) a seat bottom;

(B) a seat back mounted for pivotal movement about a generally horizontal axis between (1) a seating position in which it extends generally upwardly from the rear edge of said seat bottom and (2) a folded position in which it generally overlies said seat bottom;

(C) an arm member mounted at one end on said seat back at one side of the latter for pivotal movement relative to said seat back about a generally horizontal axis spaced from the seat back axis;

(D) a pin projecting laterally from the free end of said arm member; and (E) a fixed member positioned adjacent said one side of said seat back and defining an elongated slot extending in a generally vertical plane and including:

(1) a main portion extending generally in the same direction as the arcuate path of said arm member axis with its center line at no point more distant from said arcuate path than the distance between said arm member axis and the center of said pin, and (2) an end portion extending from one end of said main portion and having a width and direction to include within its edges a portion of the circular track of said pin with the pivot axis of said arm member at a given point in its arcuate path corresponding to one of the aforesaid positions of said seat back, whereby as said seat back reaches its said one position said arm member may pivot in a given direction about its axis to move said pin into said end portion and preclude return movement of said seat back.

7. A folding seat assembly comprising (A) a seat bottom;

(B) a seat back mounted for pivotal movement about a generally horizontal axis between (1) a seating position in which it extends generally upwardly from the the rear edge of said seat bottom and (2) a folded position in which it generally overlies said seat bottom;

(C) an arm member mounted at one end on said seat back at one side of the latter for pivotal movement relative to said seat back about a generally horizontal axis spaced from the seat back axis;

(D) a pin projecting laterally from the free end of said arm member; and (E) a fixed member positioned adjacent said one side of said seat back and defining an elongated slot extending in a generally vertical plane and including:

(1) a central portion extending generally in the same direction as the arcuate path of said arm member axis with its center line at no point more distant from said arcuate path than the distance between said arm member axis and the center of said pin, (2) a first end portion extending from one end of said central portion and having a width and direction to include within its edges a portion of the circular track of said pin with the pivot axis of said arm member at a given point in its arcuate path corresponding to one of the aforesaid positions of said seat back, whereby as said seat back reaches its said one position said arm member may pivot about its axis to move said pin into said end portion and preclude return movement of said seat back, and (3) a second end portion extending from the other end of said central portion and having a width and direction to include within its edges a portion of the circular track of said pin with the pivot axis of said arm member at another given point in its arcuate path corresponding to the other of the aforesaid positions of said seat back, whereby as said seat back reaches its said other position said arm member may pivot about its axis to move said pin into said other end portion and preclude return movement of said seat back.

8. A folding seat assembly comprising
(A) a seat bottom;
(B) a seat back mounted for pivotal movement about a generally horizontal axis between
   (1) a seating position in which it extends generally upwardly from the rear edge of said seat bottom and
   (2) a folded position in which it generally overlies said seat bottom;
(C) an arm member mounted at one end on said seat back at one side of the latter for pivotal movement relative to said seat back about a generally horizontal axis spaced from the seat back axis;
(D) a pin projecting laterally from the free end of said arm member; and
(E) a fixed member positioned adjacent said one side of said seat back and defining an elongated slot extending in a generally vertical plane and including
   (1) a central portion extending generally in the same direction as the arcuate path of said arm member axis with its center line at no point more distant from said arcuate path than the distance between said arm member axis and the center of said pin,
   (2) a first arcuate end portion having a mean radius substantially equal to the distance between said arm member axis and the center of said pin and extending from one end of said central portion with its center at a given point along the arcuate path of said arm member axis corresponding to the seating position of said seat back, whereby as said seat back reaches its seating position said pin moves into said first arcuate end portion to block return movement of said seat back, and
   (3) a second arcuate end portion having the same radius as said first end portion and extending from the other end of said central portion with its center at another given point along the arcuate path of said arm member axis corresponding to the folded position of said seat back, whereby as said seat back reaches its folded position said pin moves into said second arcuate end portion to block return movement of said seat back.

9. A folding seat assembly comprising
(A) a seat bottom;
(B) a seat back mounted for pivotal movement about a generally horizontal axis between
   (1) a seating position in which it extends generally upwardly from the rear edge of said seat bottom and
   (2) a folded position in which it generally overlies said seat bottom;
(C) an arm member mounted at one end on said seat back at one side of the latter for pivotal movement relative to said seat back about a generally horizontal axis spaced from the seat back axis;
(D) a pin projecting laterally from the free end of said arm member; and
(E) a fixed member positioned adjacent said one side of said seat back and defining an elongate slot extending in a generally vertical plane and including
   (1) a central arcuate portion centered on said seat back axis,
   (2) a first arcuate end portion having a mean radius substantially equal to the distance between said arm member axis and the center of said pin and extending from one end of said central portion with its center at a given point along the arcuate path of said arm member axis corresponding to the seating position of said seat back, whereby as said seat back reaches its seating position said pin moves into said first arcuate end portion to block return movement of said seat back, and
   (3) a second arcuate end portion having the same radius as said first end portion and extending from the other end of said central portion with its center at another given point along the arcuate path of said arm member axis corresponding to the folded position of said seat back, whereby as said seat back reaches its folded position said pin moves into said second arcuate end portion to block return movement of said seat back.

10. A folding seat assembly comprising
(A) a seat bottom;
(B) a seat back mounted for pivotal movement about a generally horizontal axis between
   (1) a seating position in which it extends generally upwardly from the rear edge of said seat bottom and
   (2) a folded position in which it generally overlies said seat bottom;
(C) an arm member mounted at one end on said seat back at one side of the latter for pivotal movement relative to said seat back about a generally horizontal axis spaced from the seat back axis;
(D) a pin projecting laterally from the free end of said arm members; and
(E) a fixed member positioned adjacent said one side of said seat back and defining an elongate slot extending in a generally vertical plane and including
   (1) a central arcuate portion centered on said seat back axis,
   (2) a first arcuate end portion having a means radius substantially equal to the distance between said arm member axis and the center of said pin and extending from one end of said central portion with its center at a given point along the arcuate path of said arm member axis corresponding to the seating position of said seat back, whereby as said seat back reaches its seating position said pin moves in a given direction into said first arcuate end portion to block return movement of said seat back, and
   (3) a second arcuate end portion having the same radius as said first end portion and extending from the other end of said central portion with its center at another given point along the arcuate path of said arm member axis corresponding to the folded position of said seat back, whereby as said seat back reaches its folded position said pin moves in said given direction into said second arcuate end portion to block return movement of said seat back; and (F) means continuously biasing said arm member for pivotal movement in said given direction, whereby to provide positive movement of said pin into said arcuate end portions.

11. A folding seat assembly comprising
(A) a seat bottom;
(B) a seat back mounted for pivotal movement about a generally horizontal axis between
 (1) a seating position in which it extends generally upwardly from the rear edge of said seat bottom and
 (2) a folded position in which it generally overlies said seat bottom;
(C) an arm member mounted at one end on said seat back at one side of the latter for pivotal movement relative to said seat back about a generally horizontal axis spaced from the seat back axis;
(D) a pin projecting laterally from the free end of said arm member; and
(E) a fixed member positioned adjacent said one side of said seat back and defining an elongate slot extending in a generally vertical plane and including:
 (1) a central arcuate portion centered on said seat back axis,
 (2) a first arcuate end portion having a mean radius substantially equal to the distance between said arm member axis and the center of said pin and extending from one end of said central portion with its center at a given point along the arcuate path of said arm member axis corresponding to the seating position of said seat back, whereby as said seat back reaches its seating position said pin moves in a given direction into said first arcuate end portion to block return movement of said seat back, and
 (3) a second arcuate end portion having the same radius as said first end portion and extending from the other end of said central portion with its center at another given point along the arcuate path of said arm member axis corresponding to the folded position of said seat back, whereby as said seat back reaches its folded position said pin moves in said given direction into said second arcuate end portion to block return movement of said seat back;
(F) means continuously biasing said arm member for pivotal movement in said given direction, whereby to provide positive movement of said pin into said arcuate end portions;
(G) a manually operable member;
(H) means mounting said manually operable member on said seat back for selective movement between said first and second positions; and
(I) means connecting said manually operable member to said arm member and operable in response to movement of said manually operable member between its first and second positions to pivot said arm member in the direction opposite to said given direction, whereby manipulation of said manually operable member moves said pin, against the action of said biasing means, out of said arcuate end portions and back into said central slot portion.

12. A folding seat assembly according to claim 11, wherein said connecting means includes a shaft journalled in said seat back on said arm member axis and connected at one end to said arm member.

References Cited

UNITED STATES PATENTS

| | | | |
|---|---|---|---|
| 2,732,003 | 1/1956 | Williams | 297—379 |
| 2,752,988 | 7/1956 | Marvin | 297—379 |
| 2,828,806 | 4/1958 | Saffer | 297—379 |
| 2,833,336 | 5/1958 | McGregor | 297—379 X |
| 2,837,794 | 2/1959 | Leslie | 297—379 |
| 3,185,525 | 5/1965 | Welsh | 297—367 |
| 3,262,737 | 7/1966 | Martens | 297—379 |

DAVID J. WILLIAMOWSKY, *Primary Examiner.*

G. O. FINCH, *Assistant Examiner.*